Patented Aug. 17, 1948

2,447,398

UNITED STATES PATENT OFFICE 2,447,398

METHOD OF MAKING POLYVINYL RESIN SOLUTIONS

Bronislaw de Supinski, Parkville, Md., assignor to The Glenn L. Martin Company, Middle River, Md., a corporation of Maryland No Drawing. Application June 1, 1944, Serial No. 538,331

1 Claim. (Cl. 260—34.2)

This invention relates to the art of synthetic resins. It is particularly concerned with the new method of making water-white, homogeneous solutions of synthetic resin compounds suitable for making dipped or cast articles.

The lower molecular weight polyvinyl resins are quite readily soluble but dipped or cast articles made therefrom are lower in strength than is desired in many articles. The higher molecular weight polyvinyl resins, for example, gamma polyvinyl chloride and vinyl chloride-vinyl acetate copolymers containing over 93% of vinyl chloride possess adequate strength for most dipped or cast articles but unfortunately are dissolved by only a few solvents, such as cyclohexanone and acetonyl acetone. Since the ability of these high molecular weight resins to dissolve at low temperatures is slight, elevated temperatures have been employed to expedite the action of the solvent. Such elevated temperatures when applied for prolonged periods of time, tend to discolor the resins and to give to articles made therefrom colors ranging from yellow to dark brown. The partial decomposition of the resins which manifests itself in such discoloration tends to cause additional decomposition.

The present invention aims to produce water-white clear, smooth and uniform solutions of high molecular weight resins and achieves this aim by the general steps of causing the solvent to penetrate into substantially all parts of the resin particles and to swell them, and heating the resulting material for a short time to convert it into the desired homogeneous solution.

The present invention will be better understood by reference to the following illustrative, but not limiting, example.

About 22.5 grams of high molecular weight copolymer of vinyl chloride and vinyl acetate containing about 93% of vinyl chloride was mixed with about 21.5 grams of dibutyl phthalate. To this mixture, which was sufficiently dry for shoveling but still was slightly damp, was added 68 c. c. of cyclohexanone, and the mixed materials were violently agitated for a short time to produce a slurry. When the quantities are small, this agitation may be accomplished by shaking but when they are larger, tumbling or stirring is preferred. The solvent should be at about room temperature when it is added to the slightly damp mixture of resin and plasticizer and the slurry should be kept at approximately room temperature during the agitation.

The slurry was then heated in such a manner as to promote penetration of the solvent into the resin particles or their agglomerates but not to result in the formation of a gel on their surfaces. Heating the slurry at a temperature of between about 50° C. and 70° C. for about 10 to 15 minutes was sufficient for this purpose. After such heating, the slurry was allowed to stand at room temperature for 12 to 15 hours. This standing time should be sufficiently long to permit the solvent to penetrate into substantially all parts of the resin particles and to swell them and may range between about 5 hours and 15 hours. When the solvent had thus penetrated and swelled the resin particles, the resulting material was heated to expedite the formation of the desired solution. Heating at temperatures between about 80° C. and about 120° C. for about an hour will usually be found to be satisfactory. Small quantities of the material may be heated at the lower temperature while larger quantities should be heated at the higher temperatures to complete the solvent action in approximately the same length of time. If larger quantities of the material, such as a commercial size batch, is heated at the lower temperature an excessively longer time will be required to convert it into the desired solution.

I believe that the addition of the solvent in a body, that is, all at substantially one time, and the thorough commingling of the solvent with the resin particles at a low temperature, followed by heating at a medium temperature for a short time prevents the formation of a gel layer on the surface of the larger resin particles or their agglomerates and expedites the dissolving of the resin particles. A gel layer is objectionable for it acts as a barrier which prevents ready penetration of the solvent into the interior of the larger resin particles and hence delays solution of those particles.

The solution prepared according to the foregoing procedure is water-white, due, I believe, to the fact that it has not been decomposed by the temperatures to which it has been subjected. It is also clear, smooth, uniformly homogeneous and when diluted can be used to make dipped or cast articles having physical properties which are substantially uniform. Since this process produces a solution under mild heating conditions, the solution may contain ingredients, such as dyes, which could not be used heretofore because of the fact that they would be decomposed by the more severe heating conditions of the prior practices.

While the present invention has been described in connection with certain specified materials, it will be understood by those skilled in the art that other high molecular weight polyvinyl resins may be subjected to this process and that appropriate plasticizers for those resins may be used; and also that additional ingredients, such as lubricants, dyes, sealants and stabilizers and other similar well known materials may be embodied in the original mixture if desired.

Having thus described the present invention so that those skilled in the art may be able to understand and practice the same I state that what I desire to secure by Letters Patent is defined in what is claimed.

I claim as my invention:

The method of making a gamma polyvinyl chloride resin solution which comprises the steps of forming a slurry by agitating a mixture comprising particles of said resin, a plasticizer for the resin and a liquid solvent capable of forming a slurry with said particles, heating the said slurry and thus causing penetration of the solvent into the resin particles, cooling and stagnating the slurry until the solvent has penetrated into substantially all parts of the resin particles and swelled them, and heating the thus treated material at a temperature not in excess of about 120° C. until it becomes a clear liquid.

BRONISLAW DE SUPINSKI.

REFERENCES CITED

The following references are of record in the file of this patent:

UNITED STATES PATENTS

| Number | Name | Date |
|---|---|---|
| 2,238,730 | Hauffe | Apr. 15, 1941 |
| 2,245,708 | Patton | June 17, 1941 |